United States Patent
Cockett et al.

[11] Patent Number: 5,846,430
[45] Date of Patent: Dec. 8, 1998

[54] EFFLUENT TREATMENT WITH HYDROTALCITE

[75] Inventors: Keith Robert Cockett, Warrington; Maurice Webb, Chester; Roderick Terence Whalley, Wallasey, all of Great Britain

[73] Assignee: Crosfield Limited, Warrington, England

[21] Appl. No.: 666,348

[22] PCT Filed: Dec. 15, 1994

[86] PCT No.: PCT/EP94/04177

§ 371 Date: Aug. 19, 1996

§ 102(e) Date: Aug. 19, 1996

[87] PCT Pub. No.: WO95/17350

PCT Pub. Date: Jun. 29, 1995

[30] Foreign Application Priority Data

Dec. 23, 1993 [GB] United Kingdom .................. 9326302

[51] Int. Cl.⁶ ............... B01D 15/00; C02F 1/28
[52] U.S. Cl. ............................. 210/691; 210/917
[58] Field of Search .................... 210/679, 691, 210/502.1, 917; 502/414

[56] References Cited

U.S. PATENT DOCUMENTS

| 4,019,982 | 4/1977 | Ikari et al. | 210/691 |
| 4,458,030 | 7/1984 | Manabe et al. | 502/414 |
| 4,752,397 | 6/1988 | Sood | 210/662 |
| 5,360,547 | 11/1994 | Cockett et al. | 210/691 |

FOREIGN PATENT DOCUMENTS

| 0541358 | 5/1993 | European Pat. Off. . |
| WO91/19850 | 12/1991 | WIPO . |

*Primary Examiner*—Ivars Cintins
*Attorney, Agent, or Firm*—Pillsbury Madison & Sutro LLP

[57] ABSTRACT

Effluents containing residual dyes are contacted with an effective amount of hydrotalcite-like material together with an effective amount of a magnesium salt or a mixture of magnesium salts, the weight ratio (on dry basis) of hydrotalcite-like material to magnesium salt being in the range of 20:1 to 1:20. Residual dyes are removed from effluents.

8 Claims, 4 Drawing Sheets

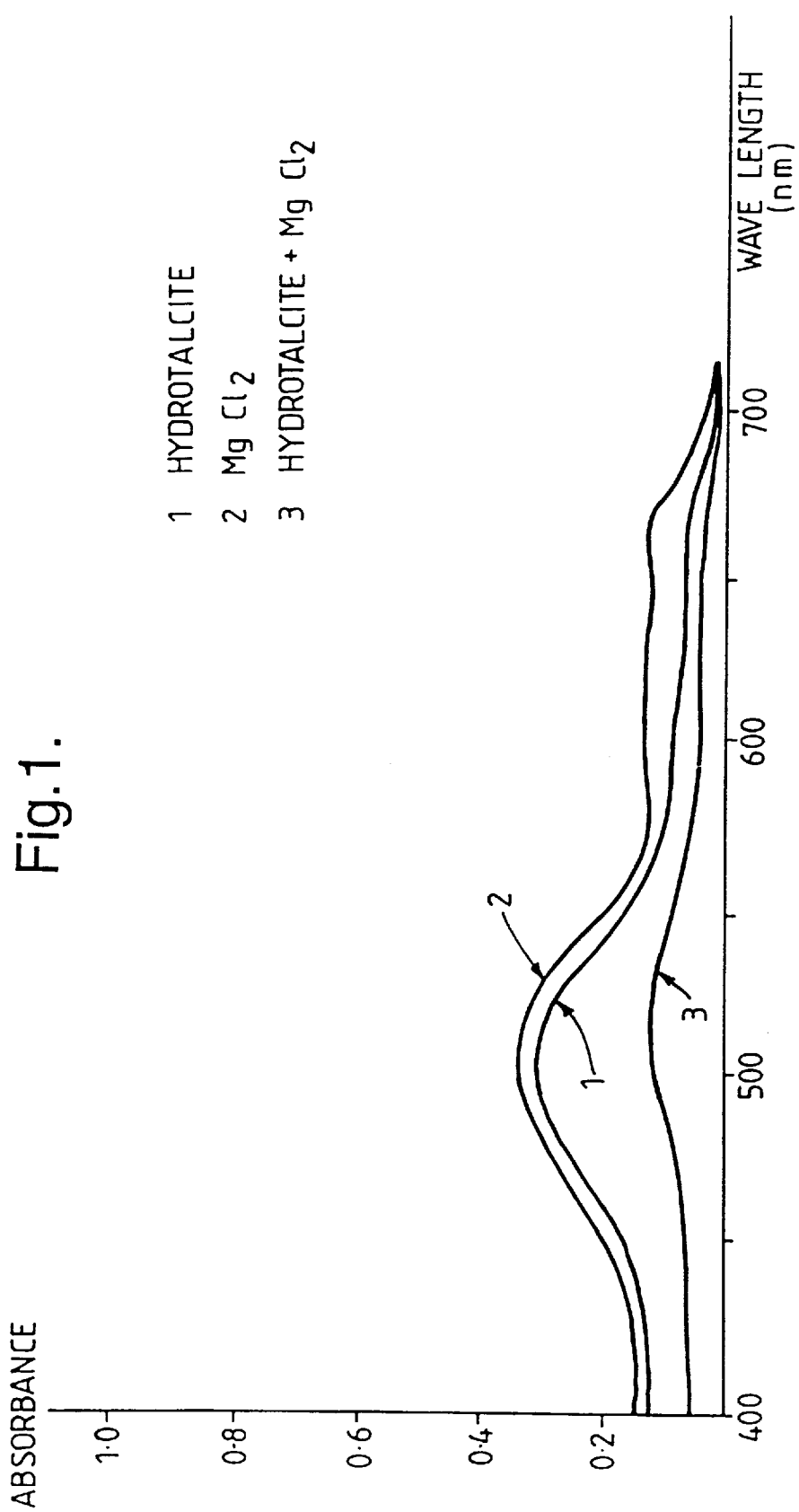

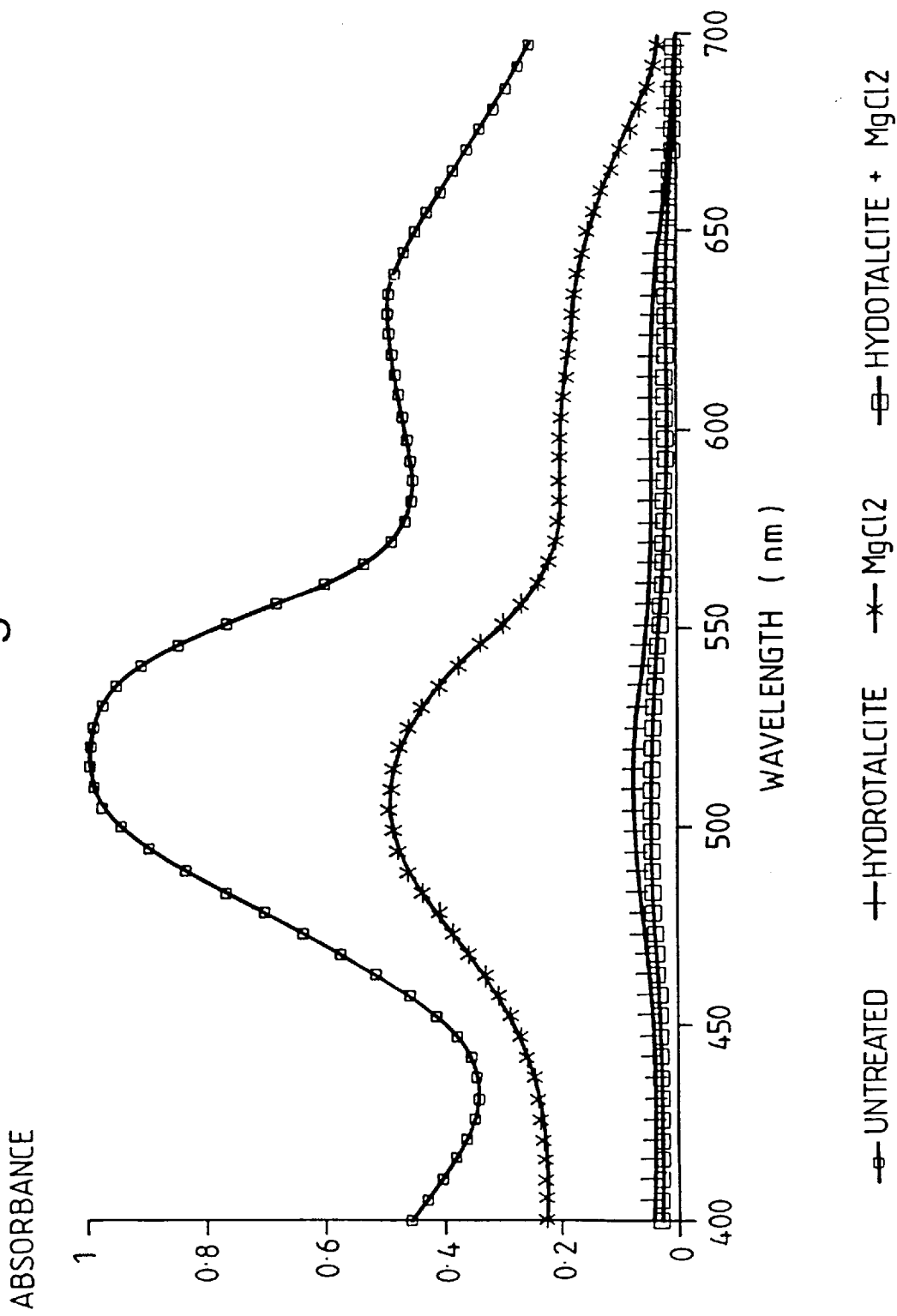

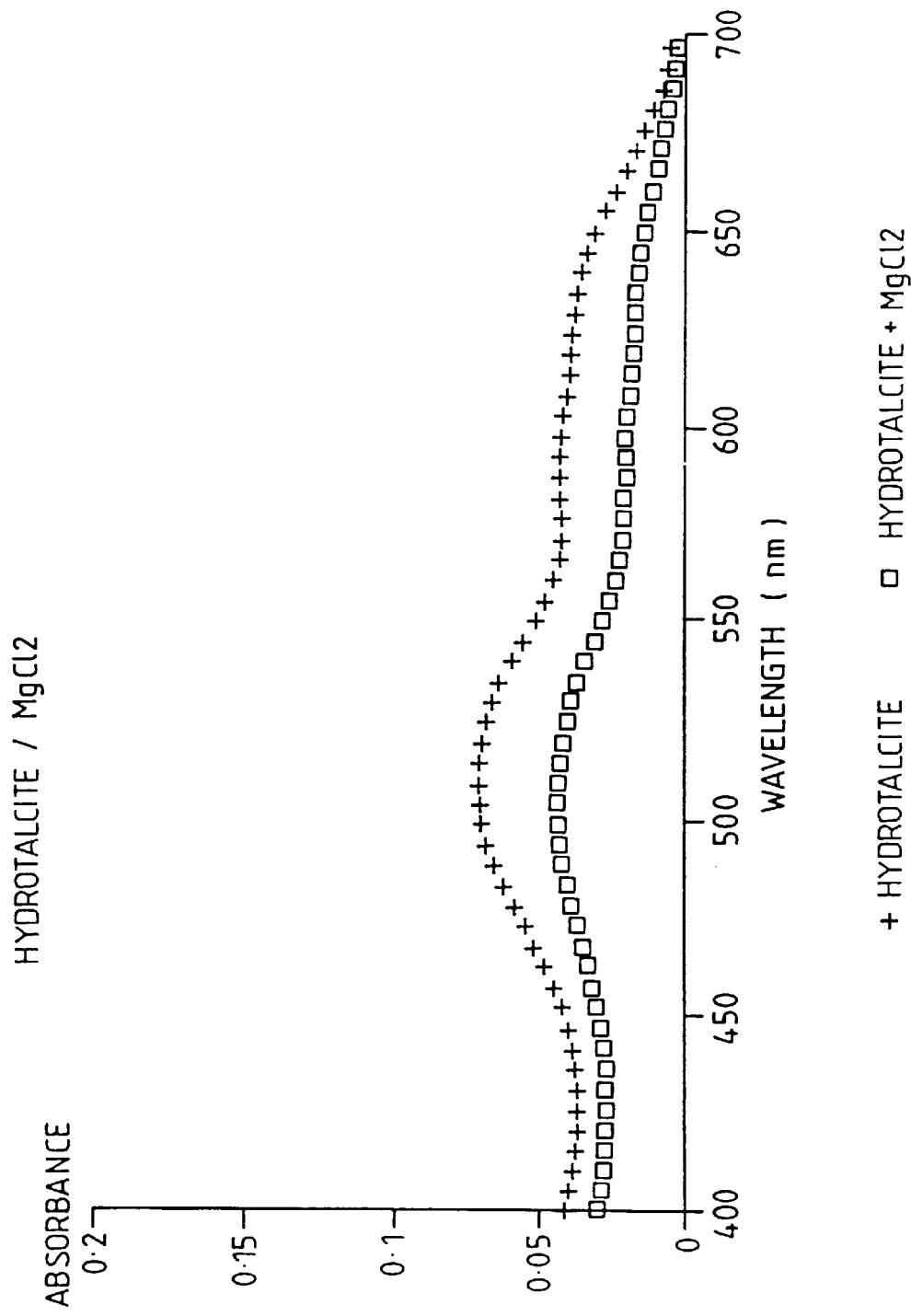

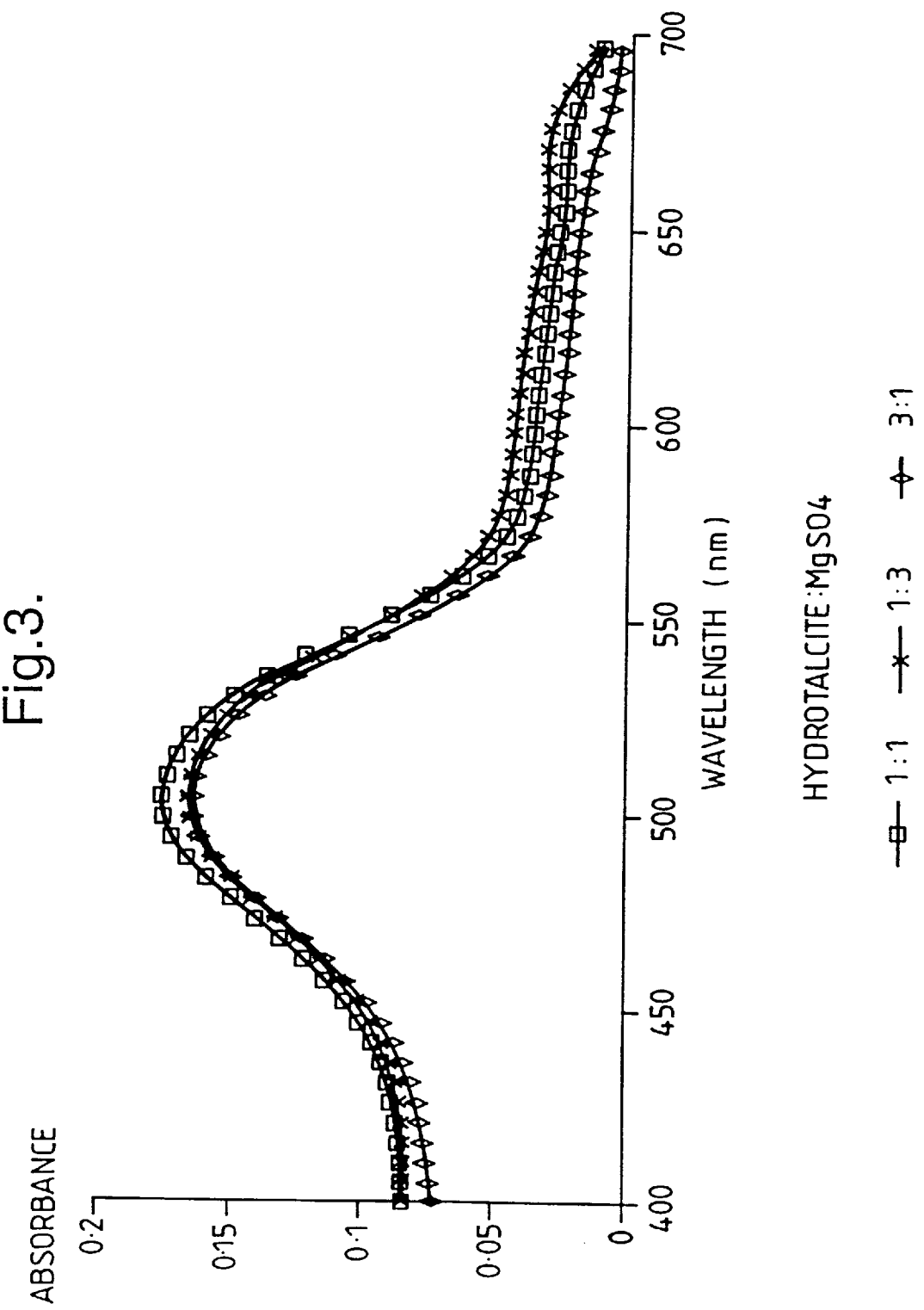

EFFLUENT TREATMENT WITH HYDROTALCITE

This application claims benefit of international application PCT/EP94 /04177, filed Dec. 15, 1994.

FIELD OF THE INVENTION

The present invention relates to effluent treatment. The present invention more specifically relates to a new adsorbent and its use in a process for removing residual dyes from effluents.

BACKGROUND OF THE INVENTION

The colour-using industries such as textiles industry, paper industry and leather industry produce effluent containing residual dyes which need to be removed.

It is already known from European Patent Application 91911139.3 that hydrotalcite like materials can be used to adsorb colours to low residual levels.

Any effluent treatment is characterized by the treatment of large volumes of effluent. In order to be cost effective when treating large volumes of effluents, there is a need for a process wherein addition levels of adsorbents are minimized.

Therefore there is a need for a process which enables a quick removal of residual dyes from effluents, in order to meet consent limits and in some instances to permit partial or total water reuse, while minimizing the use of adsorbents.

It has now been found that by adjusting the pH it is possible to dramatically increase the capacity of the adsorbent to adsorb dyes.

It has now been also found that by adding a magnesium salt to hydrotalcite-like materials, a synergistic effect is obtained which enables hydrotalcite like materials to be used much more effectively than before.

DEFINITIONS AND TESTS i) Hydrotalcite like material

By hydrotalcite-like materials it is understood products which can be described by the formula below:

$$M_{k+m}N_{n+p}(OH)_2A_z^{y-}x.H_2O$$

where:

M is any 1+ or 2+ cation or combination thereof

N is any 3+ or 4+ cation or combination thereof k is the sum of the individual mole fractions of the 1+ cations m is the sum of the individual mole fractions of the 2+ cations n is the sum of the individual mole fractions of the 3+ cations p is the sum of the individual mole fractions of the 4+ cations where either but not both of k and m or n and p can be zero and k+m+n+p=1.

$A_z^{y-}$ is any anion of charge y- and mole fraction z, or combination of anions of similar or differing y- and k+2m+3n+4p-2-zy=0 and x can range from 1 to 100.

Examples of the cations M in the above formula are Li, $Mg^{2+}$, $Zn^{2+}$, $Fe^{2+}$, $Cu^{2+}$, $Sn^{2+}$, $Ca^{2+}$ and $Sr^{2+}$. Suitable N cations include $Al^{3+}$, $Fe^{3+}$, $Ti^{4+}$ and $Sn^{4+}$.

Preferred divalent cations are $Zn^{2+}$, $Cu^{2+}$ or $Mg^{2+}$ or a combination of these ions, or a combination with other divalent cations.

The anion A may be an inorganic or organic anion. Preferred inorganic anions A are $Cl^-$, $NO_3^-$, $SO_4^{2-}$, $CO_3^{2-}$ and $OH^-$. Examples of organic anions are carboxylate ions such as citrate and stearate.

Examples of hydrotalcite-like materials of this invention are:

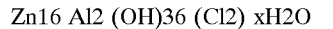Zn16 Al2 (OH)36 (Cl2) xH2O

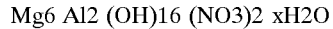Mg6 Al2 (OH)16 (NO3)2 xH2O

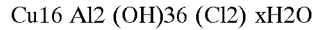Cu16 Al2 (OH)36 (Cl2) xH2O

Preparation of hydrotalcite-like compounds is known and has been described in a number of publications including Solid State Ionics 22 (1986) pages 135–141 where there is published a paper by Walter T Reichle entitled "Synthesis of Anionic Clay Minerals (Mixed Metal Hydroxides, Hydrotalcite)" and Chemtech (January 1986) pages 58–63 where there is published a paper by Walter T Reichle entitled "Anionic Clay Minerals".

ii) Capacity

To measure the capacity of adsorbent to adsorb dyes the light absorbance (A0), before treatment, and the light absorbance (A1), after treatment are measured and the capacity is defined by Capacity=100*(1−A1/A0)

GENERAL DESCRIPTION OF THE INVENTION

It is a first object of the present invention to provide a process for removing residual dyes from effluents wherein the pH of the effluent to be treated is first lowered to between pH 4 and pH 5.5, an effective amount of hydrotalcite-like material being then added the effluent to be treated, the pH being then raised to above 7.

By first decreasing the pH and then creating a caustic chock, the capacity of the adsorbent to adsorb dyes has been found to be improved.

Preferably the hydrotalcite like material is a product which can be described by the formula below:

$$M_{k+m}N_{n+p}(OH)_2A_z^{y-}x.H_2O$$

wherein M is Mg and N is Al (Mg/Al hydrotalcite).

It has also been found that the addition of a zinc salt or a magnesium salt to the hydrotalcite like material after decreasing the pH and before raising it again gives rise to a further increase of the dye adsorption.

It is second object of the present invention to provide a new adsorbent containing:

5% to 95% by weight (on dry basis) of hydrotalcite like material,

5% to 95% by weight (on dry basis) of metal salts selected from the group comprising magnesium salts, zinc salts and mixtures thereof.

Preferably, the (Hydrotalcite/Magnesium salt) weight ratio (on dry basis) is with in the range 20:1 to 1:20, more preferably within the range 10:1 to 1:10, even more preferably 3:1 to 1:3.

Magnesium salts such as $MgCl_2$ and $MgSO_4$ have been found to be particularly useful.

SPECIFIC DESCRIPTION OF THE INVENTION

The invention will be further described in the following examples with references to FIGS. 1 to 3 which represent UV visible absorbance scans showing the dye content of the aqueous phase before and after treatment with an adsorbent.

EXAMPLE 1

A stock dye solution was made up by adding 0.2 g of the following dyes to 1 liter of water.

Tetramine Blue FGC
Cibacron Scarlet F-3G
Procion Turquoise HA
Procion Red HE3B
Sumifix Supra Blue BRF
Remazol Turquoise Blue G133
Levafix Brilliant Blue E8
Direct Red 80

The pH of the stock dye solution was raised to 12 by addition of caustic soda, and was stirred for 30 mins at 90° C. This was to ensure hydrolysis of the dyes and hence more closely mimic a real effluent. The dye solution that was treated was made up by adding 50 ml of the concentrated dye solution to 950 ml of water.

Three treatments were carried out using the same method in each case.

Method
1. Take 1l of diluted dye solution.
2. Lower the pH to 5.0 by addition of HCl.
3. Add adsorbent.
4. Stir at 30° C. for 20 mins.
5. Raise pH to 10.0 by addition of caustic soda.
6. Add 1 ml of a 0.1% solution of Allied Colloids Magnafloc 1011 (which is a coagulant acting as a separation aid).
7. Stir for 1 min then allow to settle.
8. Filter a 10 ml sample of the resulting supernatant through a 0.45 μm cellulose nitrate filter.
9. Measure the absorbance from 400–700 nm on a Perkin-Elmer spectrometer.

The three treatments differed in the adsorbent system added at stage 3 of the method which was varied as follows:

Treatment 1. add 0.1 g of hydrotalcite-like material (obtainable from Joseph Crosfield & Sons, Warrington, U.K., under the trade name Macrosorb CT100).
2. add 0.5 g Magnesium Chloride Hexahydrate.
3. add 0.05 g Macrosorb CT100 (obtainable from Joseph Crosfield & Sons, Warrington, U.K., under the trade name Macrosorb CT100) and 0.25 g Magnesium Chloride Hexahydrate.

It was found that treatment 3 was better than either 1 or 2 showing a synergy when using half dosages of Macrosorb/Magnesium Chloride rather than a full dose of each independently.

FIG. 1 proves the synergistic effect between magnesium chloride and hydrotalcite-like material.

EXAMPLE 2

In this example the influence of the hydrotalcite/Mg Cl$_2$ ratio was assessed by repeating the procedure disclosed in Example 1, the total weight of hydrotalcite and MgCl$_2$ being kept constant and the capacity being measured.

The results are summarised in the following table.

| Hydrotalcite (parts by weight) | MgCl$_2$, 6H$_2$O (parts by weight) | Capacity |
|---|---|---|
| 10 | 90 | 17 |
| 25 | 75 | 19 |
| 40 | 60 | 22 |
| 50 | 50 | 23 |
| 75 | 25 | 25 |

EXAMPLE 3

The procedure in Example 1 was repeated except that the pH was decreased to 4 instead of 5. The capacity was found to increase from 25 to 30.

EXAMPLE 4

Completely dissolving the adsorbent at pH 2 and then raising the pH back to 10 gave rise to a complete removal of the dyes, the capacity in this case being almost 100.

EXAMPLE 5

A stock dye solution was made up as in Example 1 except that 0.4 g of each of the following dyes was added to 1 L of water.

Tetramine Blue FGC
Cibacron Scarlet F-3G
Remazol Turquoise Blue G133
Levafix Brilliant Blue E-8
Ramazol Red RB The method was the same as in Example 1 except that the following were added at stage 3 of the method.

Treatment 1. 0.2 g of hydrotalcite-like material (obtainable from Joseph Crosfield & Sons, Warrington, U.K., under the trade name Macrosorb CT2000)
2. 0.2 g Magnesium chloride hexahydrate
3. 0.1 g of hydrotalcite-like material (obtainable from Joseph Crosfield & Sons, Warrington, U.K., under the trade name Macrosorb CT2000M), and 0.1 g Magnesium chloride
4. 0.2 g Aluminium sulphate hexadecahydrate
5. 0.1 g of hydrotalcite-like material (obtainable from Joseph Crosfield & Sons, Warrington, U.K., under the trade name Macrosorb CT2000M), and 0.1 g Aluminium sulphate
6. 0.2 g Ferrous sulphate heptahydrate
7. 0.1 g of hydrotalcite-like material (obtainable from Joseph Crosfield & Sons, Warrington, U.K., under the trade name Macrosorb CT2000M), and 0.1 g Ferrous sulphate
8. 0.2 g Ferric sulphate hexahydrate
9. 0.1 g of hydrotalcite-like material (obtainable from Joseph Crosfield & Sons, Warrington, U.K., under the trade name Macrosorb CT2000M), and 0.1 g Ferric sulphate
10. 0.2 g Calcium chloride
11. 0.1 g of hydrotalcite-like material (obtainable from Joseph Crosfield & Sons, Warrington, U.K., under the trade name Macrosorb CT2000M), and 0.1 g Calcium chloride
12. 0.2 g Zinc Chloride Hexahydrate
13. 0.1 g of hydrotalcite-like material (obtainable from Joseph Crosfield & Sons, Warrington, U.K., under the trade name Macrosorb CT2000M), and 0.1 g Zinc Chloride Only in the case of Magnesium chloride was there found to be a synergy at all wavelengths from 400–700 nm, this synergistic effect being disclosed on FIGS. 2.1 and 2.2. Zinc Aluminium and Iron (III) show synergy above approximately 570 nm. Iron (II) and Calcium show no synergy.

EXAMPLE 6

The general procedure disclosed in Example 1 was repeated except the pH after the addition of the adsorbent was only raised to pH 7.5.

In a first test the adsorbent was 0.05 g of Hydrotalcite like material (CT100) and 0.25 g of MgCl$_2$. The capacity was found to be 24.

In a second test the adsorbent was 0.05 g of Hydrotalcite like material (CT100) and 0.25 g of $ZnCl_2$. The capacity was found to be 45.

Therefore using $ZnCl_2$ instead of $MgCl_2$, gives rise to a dramatic increase in capacity together with the added benefit that lest caustic is necessary since the pH is only raised up to 7.5. The difference with Example 5, test 13 is that, in the former case the pH was raised up to 10, leading to a complete dissolution of $ZnCl_2$. It is the reason why, when using $ZnCl_2$, the pH has to be kept between 7.5 and 8.5.

EXAMPLE 7

The dye solution and method were the same as in Example 5, except the following were added at stage 3 of the method.

Treatment 1. 0.1 g of hydrotalcite-like material (obtainable from Joseph Crosfield & Sons, Warrington, U.K., under the trade name Macrosorb CT2000M), and 0.1 g Magnesium sulphate (ratio=1:1).

2. 0.05 g of hydrotalcite-like material (obtainable from Joseph Crosfield & Sons, Warrington, U.K., under the trade name Macrosorb CT2000M) and 0.15 g Magnesium sulphate (ratio=1:3).

3. 0.15 g of hydrotalcite-like material (obtainable from Joseph Crosfield & Sons, Warrington, U.K., under the trade name Macrosorb CT2000M), and 0.05 g Magnesium sulphate ratio=3:1.

Treatment 1 shows that there is a synergy with magnesium sulphate, proving therefore that the important element of the invention is the use of a magnesium salt.

Treatments 2 and 3 show that the synergy is also seen for other ratios of hydrotalcite-like material to magnesium salt.

The results are summarized on FIG. 3.

We claim:

1. Process for removing residual dyes from effluents which comprises lowering the pH of the effluent to be treated to between pH 4 and pH 5.5, adding an effective amount of hydrotalcite-like material to the effluent to be treated, and then raising the pH of the effluent to above 7.

2. Process according to claim 1 which comprises adding metal salts selected from the group consisting of magnesium salts, zinc salts and mixtures thereof to the effluent to be treated after having decreased the pH and before having raised it.

3. Process according to claim 2 which comprises adding $ZnCl_2$ to the effluent and then raising the pH to between pH 7.5 and pH 8.5.

4. Process according to claim 2 which comprises adding magnesium salt and then raising the pH to a pH of at least 9.

5. Process according to claim 4 wherein the weight ratio (on dry basis) of hydrotalcite-like material to magnesium salt is in the range of 20:1 to 1:20.

6. The process of claim 1 wherein the hydrotalcite-like material added to the effluent is in the form of an adsorbent comprising:

5% to 95% by weight (on dry basis) of the hydrotalcite like material, and

5% to 95% by weight (on dry basis) of metal salts selected from the group consisting of magnesium salts, zinc salts and mixtures thereof.

7. The process of claim 6 wherein the magnesium salt is chosen from the group consisting of $MgCl_2$ and $MgSO_4$.

8. The process of claim 6 wherein the zinc salt is $ZnCl_2$.

* * * * *